United States Patent
Auxier et al.

(10) Patent No.: US 10,626,730 B2
(45) Date of Patent: Apr. 21, 2020

(54) ENHANCED COOLING FOR BLADE TIP

(71) Applicant: UNITED TECHNOLOGIES CORPORATION, Farmington, CT (US)

(72) Inventors: James T. Auxier, Bloomfield, CT (US); Thomas N. Slavens, Vernon, CT (US); Brandon S. Donnell, Hartford, CT (US); Yafet Girma, Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 369 days.

(21) Appl. No.: 15/038,485

(22) PCT Filed: Nov. 5, 2014

(86) PCT No.: PCT/US2014/063974
§ 371 (c)(1),
(2) Date: May 23, 2016

(87) PCT Pub. No.: WO2015/094498
PCT Pub. Date: Jun. 25, 2015

(65) Prior Publication Data
US 2016/0298463 A1 Oct. 13, 2016

Related U.S. Application Data

(60) Provisional application No. 61/916,980, filed on Dec. 17, 2013.

(51) Int. Cl.
*F01D 5/18* (2006.01)
*F01D 5/20* (2006.01)
(Continued)

(52) U.S. Cl.
CPC .............. *F01D 5/186* (2013.01); *F01D 5/187* (2013.01); *F01D 5/20* (2013.01); *F01D 9/02* (2013.01);
(Continued)

(58) Field of Classification Search
CPC . F01D 5/20; F01D 5/186; F01D 5/187; F01D 5/182; F01D 5/183; F01D 9/02;
(Continued)

(56) References Cited

U.S. PATENT DOCUMENTS 5,352,092 A * 10/1994 Ferleger .................. F01D 5/141
416/223 A
6,179,556 B1 * 1/2001 Bunker .................... F01D 5/187
415/115

(Continued)

OTHER PUBLICATIONS

International Search Report and Written Opinion for PCT Application No. PCT/US2014/063974, dated Feb. 11, 2015.
(Continued)

*Primary Examiner* — Carlos A Rivera
(74) *Attorney, Agent, or Firm* — Carlson, Gaskey & Olds, P.C.

(57) ABSTRACT

In a featured embodiment, a gas turbine engine component comprises an airfoil having a leading edge, a trailing edge, and pressure and suction side walls extending from the leading edge to the trailing edge. The airfoil extends from a base to a tip. A shelf is formed in the tip, and extends from the pressure side wall, around the leading edge, to the suction side wall.

24 Claims, 5 Drawing Sheets

(51) Int. Cl.
F01D 9/02 (2006.01)
F02C 3/04 (2006.01)
F02C 7/18 (2006.01)

(52) U.S. Cl.
CPC .................. *F02C 3/04* (2013.01); *F02C 7/18* (2013.01); *F05D 2220/32* (2013.01); *F05D 2240/303* (2013.01); *F05D 2240/305* (2013.01); *F05D 2240/306* (2013.01); *F05D 2240/307* (2013.01); *F05D 2240/35* (2013.01); *F05D 2250/71* (2013.01); *F05D 2260/202* (2013.01); *Y02T 50/676* (2013.01)

(58) Field of Classification Search
CPC .................. F02C 7/18; F05D 2240/307; F05D 2240/303; F05D 2240/305; F05D 2240/306; F05D 2240/35; F05D 2220/32; F05D 2260/202
See application file for complete search history.

(56) References Cited

U.S. PATENT DOCUMENTS

| | | | | |
|---|---|---|---|---|
| 6,190,129 | B1 * | 2/2001 | Mayer | F01D 5/187 416/235 |
| 6,382,913 | B1 * | 5/2002 | Lee | F01D 5/141 416/92 |
| 7,473,073 | B1 * | 1/2009 | Liang | F01D 5/20 415/173.5 |
| 8,075,268 | B1 | 12/2011 | Liang | |
| 8,113,779 | B1 * | 2/2012 | Liang | F01D 5/20 416/92 |
| 9,228,442 | B2 * | 1/2016 | Mongillo, Jr. | F01D 5/20 |
| 9,284,845 | B2 * | 3/2016 | Lewis | F01D 5/20 |
| 2004/0013515 | A1 | 1/2004 | Cherry et al. | |
| 2004/0151587 | A1 | 8/2004 | Cunha et al. | |
| 2012/0189427 | A1 * | 7/2012 | Kwon | F01D 5/20 415/1 |
| 2013/0266454 | A1 * | 10/2013 | Mongillo, Jr. | F01D 5/20 416/97 R |
| 2014/0165593 | A1 * | 6/2014 | Quach | F01D 5/186 60/806 |
| 2014/0311164 | A1 * | 10/2014 | Kwon | F01D 5/20 60/806 |

OTHER PUBLICATIONS

International Preliminary Report on Patentability for International Application No. PCT/US2014/063974 dated Jun. 30, 2016.
Supplementary European Search Report for European Application No. 14871835.6 dated Oct. 25, 2017.

* cited by examiner

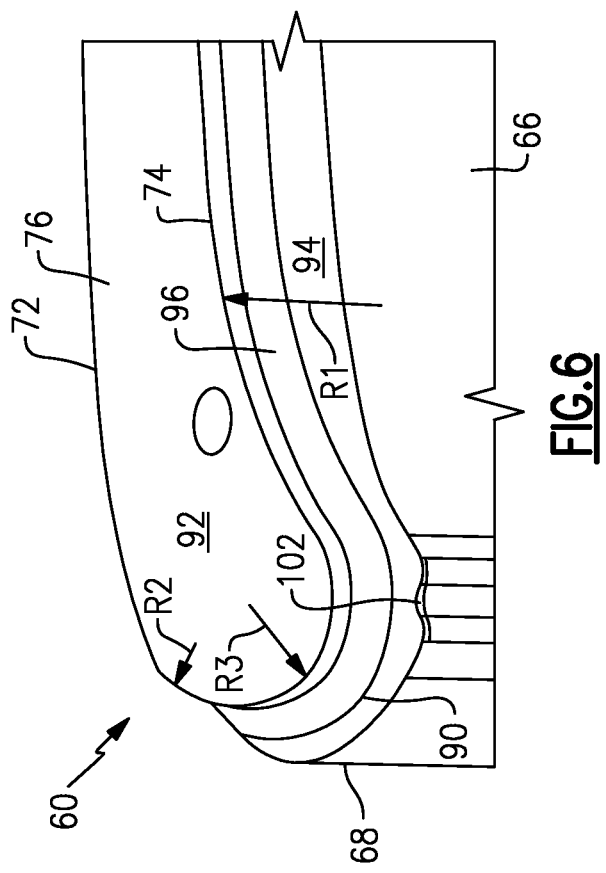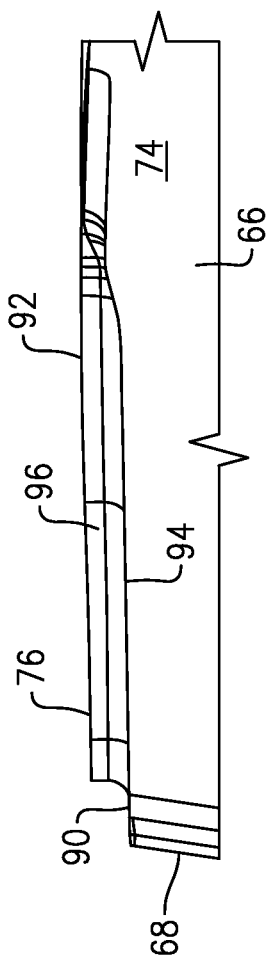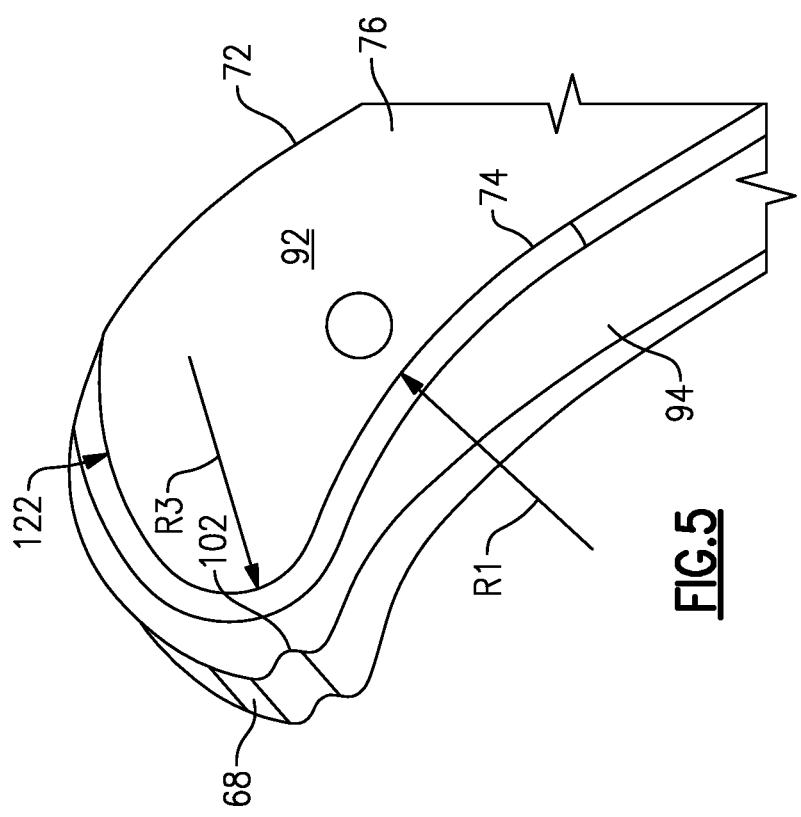

ENHANCED COOLING FOR BLADE TIP

CROSS-REFERENCE TO RELATED APPLICATION

This application claims priority to U.S. Provisional Patent Application No. 61/916,980, filed Dec. 17, 2013.

BACKGROUND OF THE INVENTION

In pursuit of higher engine efficiencies, higher turbine inlet temperatures have been relied upon to boost overall engine performance. This can result in gas path temperatures that may exceed melting points of turbine component materials. To address this issue, dedicated cooling air is extracted from a compressor section and is used to cool the gas path components in the turbine, such as rotating blades and stator vanes for example.

One method of cooling turbine airfoils utilizes internal cooling passages. Typically, film cooling holes and significant volumes of cooling air are required to provide the needed amount of cooling. One area that is difficult to effectively cool is a tip of the airfoil. Tip shelves and squealer pockets have been incorporated into the tip of the blade to improve cooling but have not always been capable of effectively cooling a leading edge portion of the tip.

SUMMARY OF THE INVENTION

In a featured embodiment, a gas turbine engine component comprises an airfoil having a leading edge, a trailing edge, and pressure and suction side walls extending from the leading edge to the trailing edge. The airfoil extends from a base to a tip. A shelf is formed in the tip, and extends from the pressure side wall, around the leading edge, to the suction side wall.

In another embodiment according to the previous embodiment, the tip defines a distal end surface of the airfoil. The shelf defines a bottom surface that is spaced radially inwardly of the distal end surface, and includes a shelf wall surface extending from the distal end surface to the bottom surface.

In another embodiment according to any of the previous embodiments, at least one cooling hole or slot is formed within one of the bottom surface and shelf wall.

In another embodiment according to any of the previous embodiments, the airfoil is defined by a length extending in a direction from the leading edge to the trailing edge. A distance between the shelf wall and an outer surface of the pressure side wall varies along the length of the airfoil.

In another embodiment according to any of the previous embodiments, the shelf wall is defined by a first radius on the pressure side wall and by a second radius on the suction side wall that is different than the first radius.

In another embodiment according to any of the previous embodiments, the first radius is greater than the second radius.

In another embodiment according to any of the previous embodiments, the shelf wall is defined by a third radius at the leading edge that is different from at least one of the first radius and second radius.

In another embodiment according to any of the previous embodiments, the first radius is greater than the second radius. The third radius is less than the second radius.

In another embodiment according to any of the previous embodiments, the bottom surface extends uninterrupted around the leading edge from the pressure side wall to the suction side wall.

In another embodiment according to any of the previous embodiments, the shelf extends a greater distance along the pressure side wall than along the suction side wall.

In another embodiment according to any of the previous embodiments, at least one internal cooling passage is formed within the airfoil and at least one cooling hole formed within the shelf that is in fluid communication with the at least one internal cooling passage.

In another embodiment according to any of the previous embodiments, the at least one cooling hole comprises a plurality of cooling holes formed in the shelf. The cooling holes are located at the leading edge, pressure side wall, and suction side wall.

In another embodiment according to any of the previous embodiments, the tip includes a squealer pocket.

In another featured embodiment, a gas turbine engine comprises a compressor section, a combustor section downstream of the compressor section, and a turbine section downstream of the combustor section. The turbine section includes at least one airfoil having a leading edge, a trailing edge, and pressure and suction side walls extending from the leading edge to the trailing edge. The airfoil extends from a base to a tip. A shelf formed in the tip, and extends from the pressure side wall, around the leading edge, to the suction side wall.

In another embodiment according to the previous embodiment, the tip defines a distal end surface of the airfoil. The shelf defines a bottom surface that is spaced radially inwardly of the distal end surface, and includes a shelf wall surface extending from the distal end surface to the bottom surface.

In another embodiment according to any of the previous embodiments, a plurality of cooling holes or slots are formed within the bottom surface and/or shelf wall. The holes or slots are located at the pressure side wall, leading edge, and suction side wall.

In another embodiment according to any of the previous embodiments, the airfoil is defined by a length extending in a direction from the leading edge to the trailing edge. A distance between the shelf wall and an outer surface of the pressure side wall varies along the length of the airfoil.

In another embodiment according to any of the previous embodiments, the shelf wall is defined by a first radius on the pressure side wall and by a second radius on the suction side wall that is different than the first radius.

In another embodiment according to any of the previous embodiments, the first radius is greater than the second radius. The shelf wall is defined by a third radius at the leading edge that is less than the second radius.

In another embodiment according to any of the previous embodiments, the shelf extends a greater distance along the pressure side wall than along the suction side wall.

The foregoing features and elements may be combined in any combination without exclusivity, unless expressly indicated otherwise.

These and other features may be best understood from the following drawings and specification.

BRIEF DESCRIPTION OF THE DRAWINGS

FIG. 5 shows an enlarged top view of the tip of the airfoil section showing the shelf extending from a pressure side, around a leading edge, and to a suction side of the airfoil.

FIG. 6 is a leading edge side view of FIG. 5.

FIG. 7 is a pressure side view of FIG. 5.

DETAILED DESCRIPTION

Figure 1:
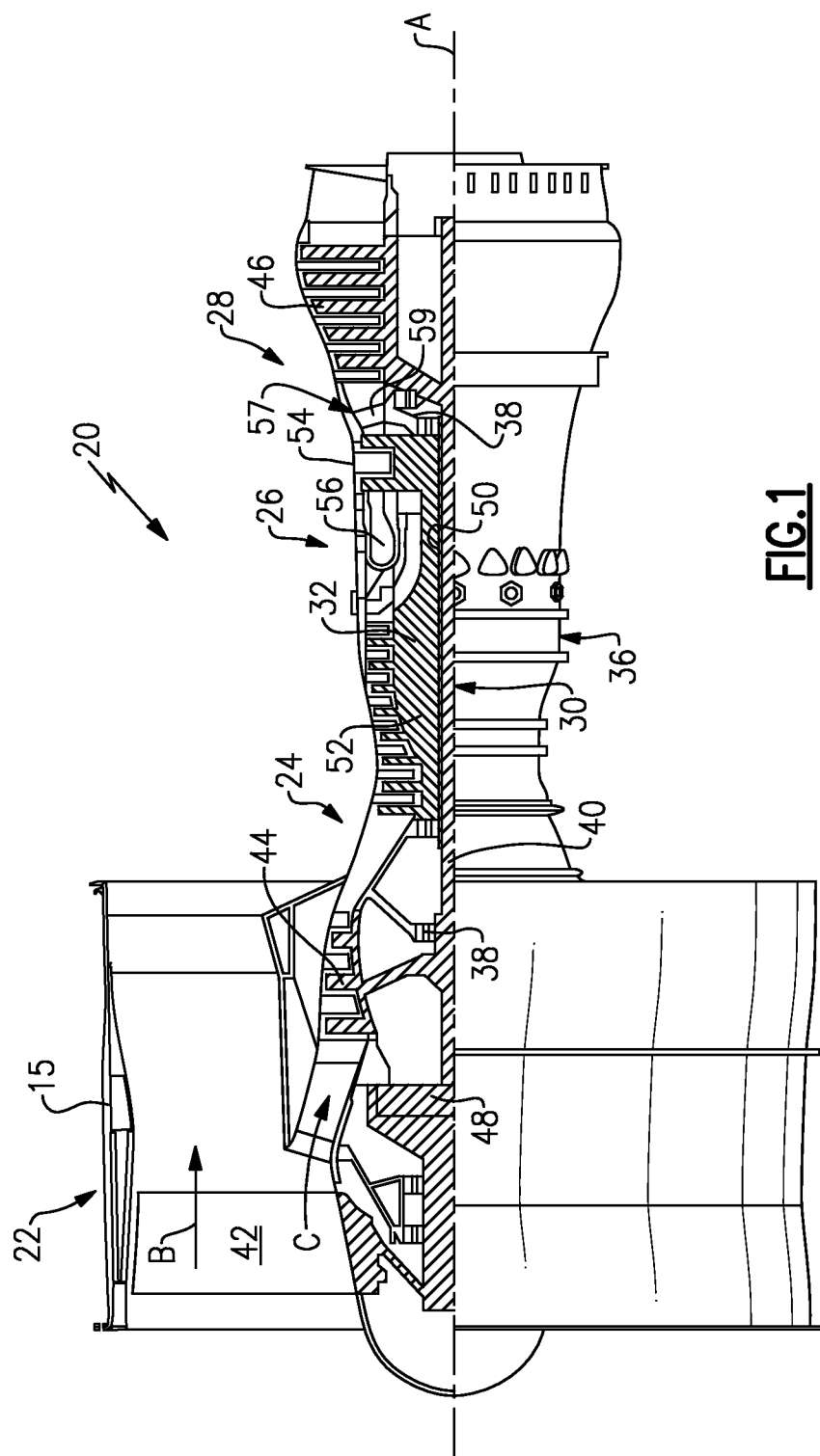
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
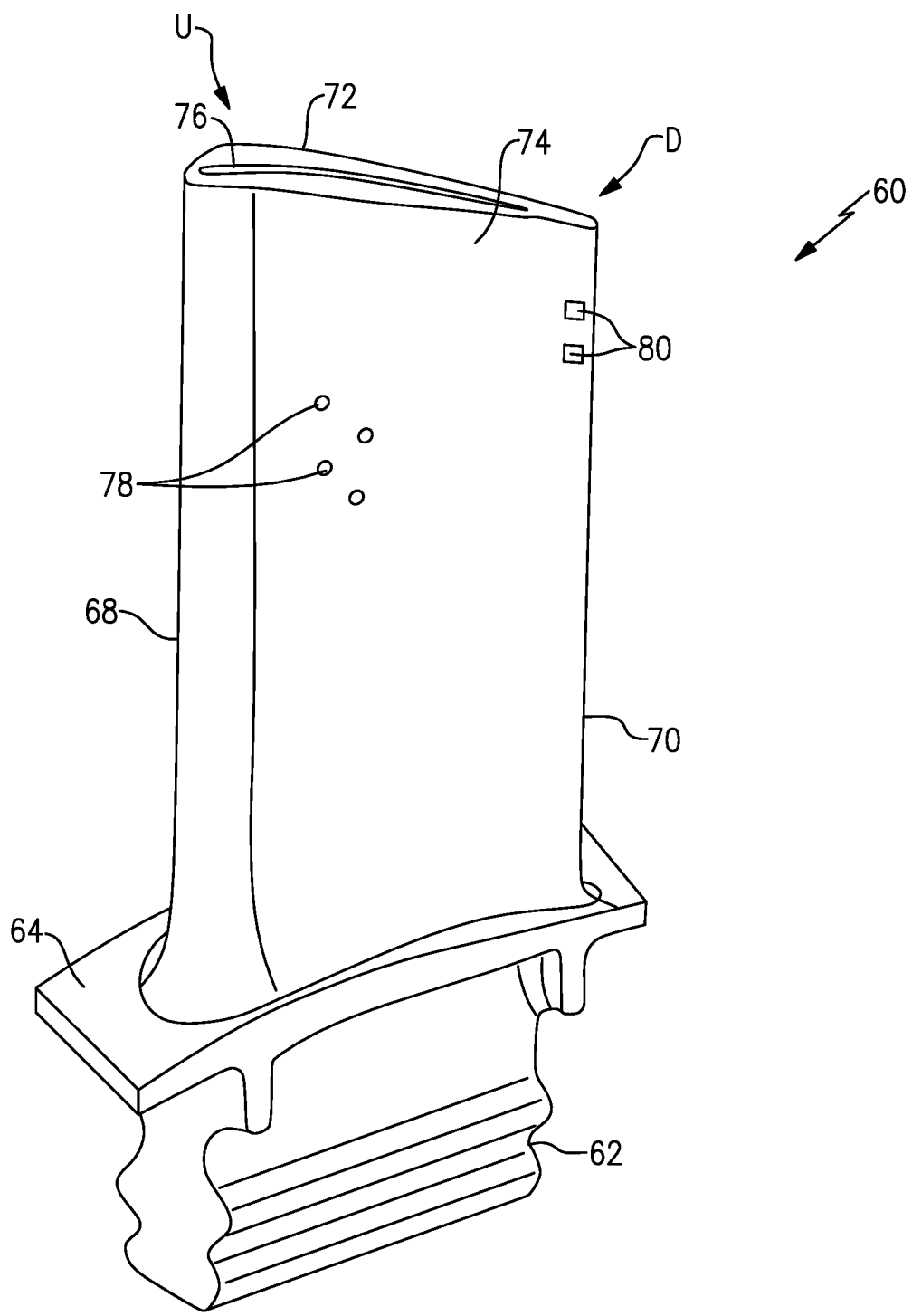
FIG. 2 is a side perspective view of a turbine blade.

Airfoils located downstream of combustor section 26, such as stator vanes and rotor blades in the turbine section 28, for example, operate in a high-temperature environment. Airfoils that are exposed to high temperatures typically include cooling circuits with internal cooling channels that direct a flow of cooling air through the airfoil to remove heat and prolong the useful life of the airfoil. FIG. 2 is a side view of a turbine rotor blade 60 having a root section 62, a platform 64, and an airfoil section 66. Root section 62 is connected to a rotor in the turbine section 28 (FIG. 1) as known. The airfoil section 66 includes a leading edge 68, a trailing edge 70, a suction side wall 72, and a pressure side wall 74. The airfoil section 66 extends from a base at the platform 64 to a tip 76, and includes a plurality of surface cooling holes, such as film cooling holes 78, and a plurality of trailing edge cooling slots 80.

The platform 64 connects one end of airfoil section 66 to root section 62. The leading edge 68, trailing edge 70, suction side wall 72, and pressure side wall 74 extend outwardly away from the platform 64. The tip 76 closes off an opposite end of the airfoil section 66 from the platform 64. Suction side wall 72 and pressure side wall 74 extend from upstream ends U to downstream ends D to connect the leading edge 68 to the trailing edge 70. Film cooling holes 78 are arranged over a surface of the airfoil section 66 to provide a layer of cool air proximate the surface of airfoil section 66 for protection from high-temperature combustion gases. Trailing edge cooling slots 80 are arranged along trailing edge 70 to provide an exit for air circulating within airfoil section 66.

Figure 3:
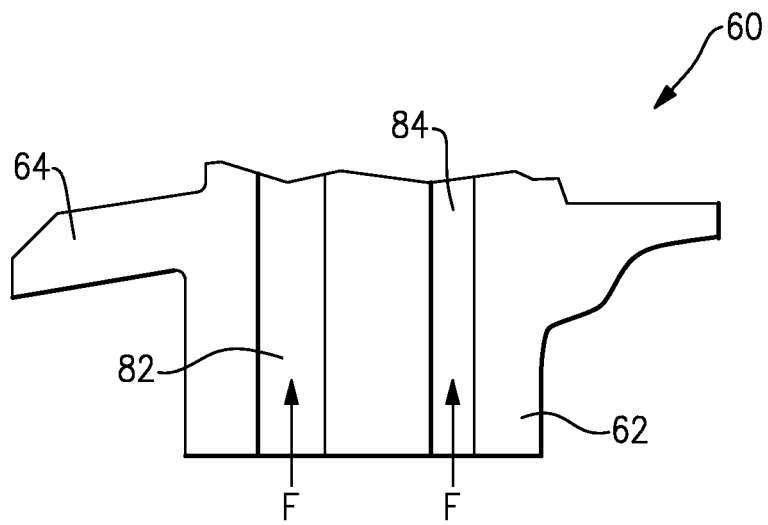
FIG. 3 is a schematic cross-sectional view of a root section of the blade of FIG. 2.

FIG. 3 is a schematic section view of the root section 62 of the rotor blade 60 of FIG. 2. The rotor blade 60 includes one or more internal cooling channels. In the example shown, there is at least a first cooling channel 82 near the leading edge 68, and a second cooling channel 84 positioned aft of the first cooling channel 82. The cooling channels 82, 84 direct cooling flow F radially outwardly toward the tip 76 of the blade 60. The cooling channels 82, 84 deliver cooling flow to the film cooling holes 78 and the cooling slots 80.

Figure 4:
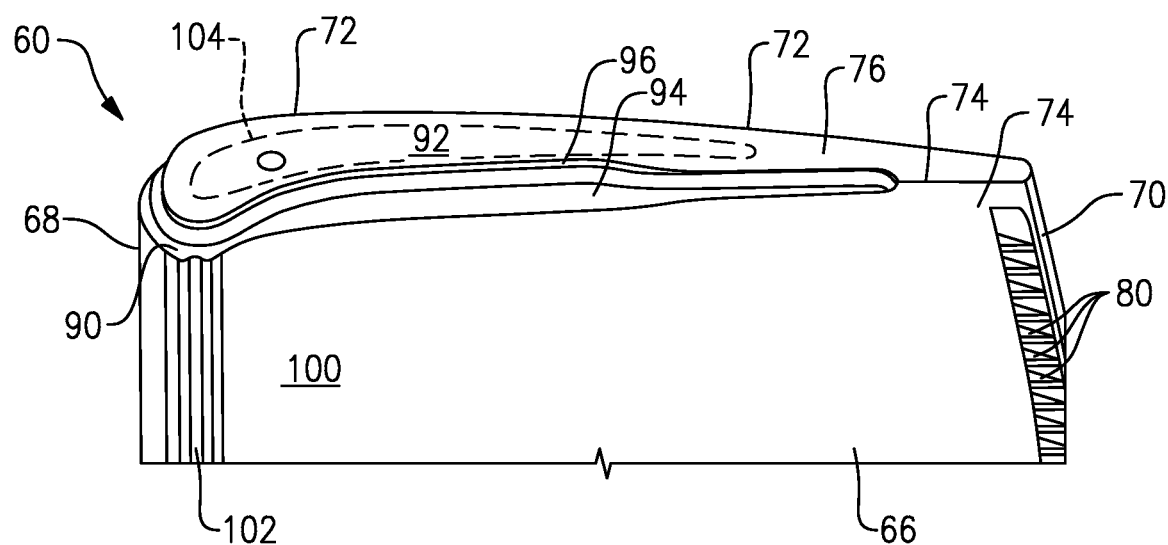
FIG. 4 is a perspective view of a tip shelf in the tip of the airfoil section of the blade of FIG. 2.

As shown in FIG. 4, a tip shelf 90 is formed in the tip 76. The shelf 90 extends from the pressure side wall 74, around the leading edge 68, to the suction side wall 72. In other words, the tip shelf 90 comprises a wrap-around shelf that wraps around the leading edge 68 in an uninterrupted fashion from the pressure side wall 74 to the suction side wall 72.

The tip 76 defines a distal end surface 92 of the airfoil 66 and the shelf 90 defines a bottom surface 94 that is spaced radially inwardly of the distal end surface 92 in a direction toward the axis A. A shelf wall surface 96 extends from an upper edge 122 of the distal end surface 92 to the bottom surface 94. In the example shown, the shelf wall surface 96 cooperates with the distal end surface 92 and bottom surface 94 to form an L-shape; however, other profiles could also be utilized. For example, the entire shelf may be provided as a continuous radiussed surface, such as a quarter-pipe shape.

Figure 8:
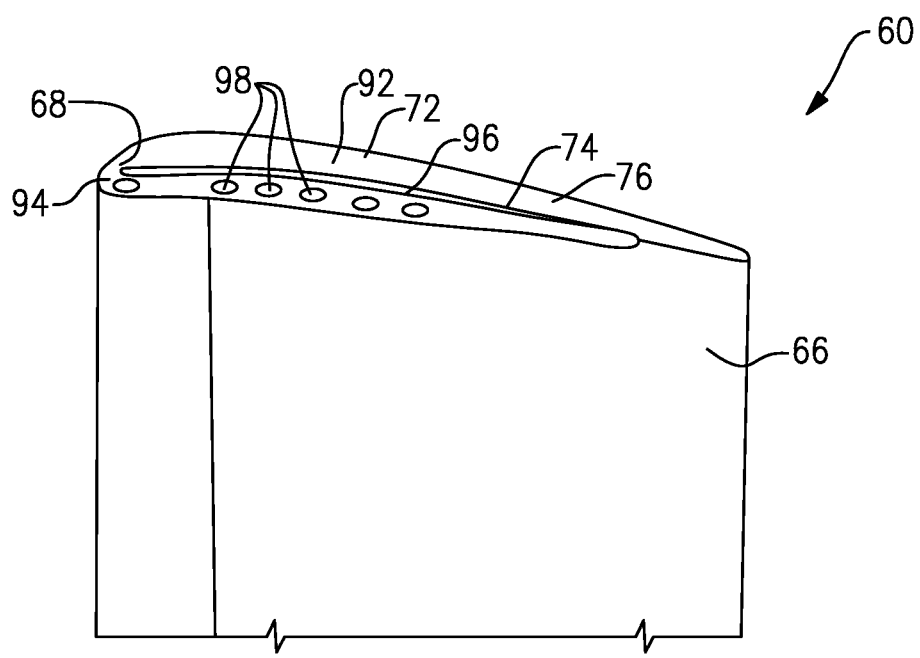
FIG. 8 shows an example of cooling holes formed in the shelf.

As shown in FIG. 8, one or more cooling slots and/or holes 98 are formed within the bottom surface 94. The cooling slots or holes 98 could also be formed in the wall surface 96 or a corner/radius between the wall surface 96 and the bottom surface 94 and/or end surface 92. The cooling slots or holes 98 are in fluid communication with the internal cooling channels 82, 84 (FIG. 3). In one example, the cooling slots or holes 98 are located at the leading edge 68, and at the pressure 74 and suction 72 side walls.

The airfoil 66 is defined by a length extending in a direction from the leading edge 68 to the trailing edge 70. In one example, a distance between the shelf wall surface 96 and an outer surface 100 of the pressure side wall 74 varies along the length of the airfoil 66.

As shown in FIG. 5, in one example, the shelf wall surface 96 is defined by a first radius R1 on the pressure side wall 74 and is defined by a second radius R2 on the suction side wall 72. In one example, the second radius R2 is different than the first radius R1. For example, the first radius R1 is greater than the second radius R2.

Also, in the example shown, the shelf wall surface 96 is defined by a third radius R3 at the leading edge 68 as shown in FIG. 5. In one example, the third radius R3 is different from at least one of the first radius R1 and second radius R2. For example, the first radius R1 is greater than the second radius R2, and the third radius R3 is less than the second radius R2. The contour provided by varying the radii further enhances cooling effectiveness. The radii used to define the shelf 90 are application dependent, and can provide different radius combination than that shown in the figures. Further, in certain applications the shelf 90 may be defined by sharp corners instead of radii.

As shown in FIG. 6, the bottom surface 94 extends uninterrupted around the leading edge 68 from the pressure side wall 74 to the suction side wall 72. In one example, the shelf 90 extends a greater distance along the pressure side wall 74 than along the suction side wall 72. In other example configurations, the length of the shelf portions on the pressure 74 and suction 72 side walls may vary as needed for various applications.

In one example shown in FIG. 7, the depth of the shelf 90, which extends from the distal end surface 92 to the bottom surface 94, is generally constant around the leading edge 68. The depth remains generally constant as the shelf 90 extends from the leading edge toward the trailing edge 70. The depth of the shelf 90 decreases to a shallower depth near the trailing edge 70 (see FIG. 4).

The leading edge 68 may include a radially extending trench or groove 102 as best shown in FIGS. 4-6. Optionally, the leading edge 68 may simply be a rounded surface.

Also, as indicated schematically in FIG. 4, the airfoil section 66 may include a squealer pocket 104 to further enhance cooling. Any squealer pocket shape and/or configuration could be incorporated into the tip 76 of the airfoil section 66. The tip shelf 90 can be used either with or without the squealer pocket 104.

Thermal distress has been observed in the tip of turbine blades 60 in the form of coating spallation, oxidation, and thermal cracking. The distress has been primarily observed toward the leading edge 68 on surfaces without film cooling on both the pressure 74 and suction 72 sides, as well as the trailing edge 70. Current turbine blade tip designs with internal cores have a geometric configuration, where the distance front the extreme leading edge corner of the external blade tip to the nearest internally cooled cavity surface leaves a relatively large mass of metal in this extreme leading edge tip region that is not as effectively cooled as the remainder of the tip 76. Because of the gas path streamlines around the tip 76, traditional film cooling is far less effective in this region, even when a leading edge trench design is used to funnel showerhead cooling air towards the tip 76. As a result of these cooling limitations of both conductive and convective nature, metal temperature in this extreme leading edge tip region may exceed that of the remainder of the blade, and thus it becomes one of the first regions to experience thermal distress.

The recessed shelf 90 is incorporated into both the suction 72 and pressure 74 sides of the tip 76 of the airfoil 66, wrapping around the intersection of the leading edge camber/chord line, with integral cooling holes 98 supplied by internal cooling passages 82, 84. The cooling holes 98 in this shelf region supply a cooled fluid boundary layer. Further, incorporation of the wrap-around tip shelf 90 removes the extreme leading edge tip mass of metal and provides a surface through which cooling holes/slots may be created and upon which film cooling may be more efficiently deposited. Additionally, the wrap-around tip shelf 90 effectively locates the remaining extreme leading edge tip edges closer to the internal cooled cavities. Finally, unsteady computational fluid dynamic analysis has shown that the effect of removing this leading edge corner of the blade face (as viewed from the pressure side) when a leading edge wrap-around shelf is included with a pressure-side tip shelf does not allow any more pressure side gas leakage over the tip than with a pressure-side tip shelf alone, so there is no loss of turbine efficiency due to the altered blade geometry.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine component comprising:
an airfoil having a leading edge, a trailing edge, and pressure and suction side walls extending from upstream ends at the leading edge to downstream ends at the trailing edge, and wherein the airfoil extends from a base to a tip that defines a distal end surface of the airfoil, and wherein the airfoil is defined by a length extending in a direction from the leading edge to the trailing edge;
a shelf formed in the tip, the shelf extending from the pressure side wall, around the leading edge, to the suction side wall, and wherein the shelf defines a bottom surface that is spaced radially inwardly of the distal end surface, and including a shelf wall surface extending from the distal end surface to the bottom surface, and wherein a distance between the shelf wall surface and an outer surface of the pressure side wall varies along the length of the airfoil; and
wherein the shelf wall surface extends along the pressure side wall, around the leading edge, and terminates at an outer surface adjacent the upstream end of the suction side wall such that the shelf extends a greater distance along the pressure side wall than along the suction side wall.

2. The gas turbine engine component according to claim 1 including at least one cooling hole or slot formed within one of the bottom surface and shelf wall surface.

3. The gas turbine engine component according to claim 1 wherein the shelf wall surface is defined by a first radius on the pressure side wall and is defined by a second radius on the suction side wall that is different than the first radius.

4. The gas turbine engine component according to claim 3 wherein the first radius is greater than the second radius.

5. The gas turbine engine component according to claim 3 wherein the shelf wall surface is defined by a third radius at the leading edge that is different from at least one of the first radius and second radius.

6. The gas turbine engine component according to claim 5 wherein the first radius is greater than the second radius, and wherein the third radius is less than the second radius.

7. The gas turbine engine component according to claim 1 wherein the bottom surface extends uninterrupted around the leading edge from the pressure side wall to the suction side wall.

8. The gas turbine engine component according to claim 1 wherein the distal end surface extends across the tip from the shelf wall surface on a pressure side of the airfoil to the shelf wall surface at an upstream end of a suction side of the airfoil, and wherein the bottom surface of the shelf extends uninterrupted around the leading edge from the pressure side wall to terminate at the outer surface adjacent the upstream end of the suction side wall.

9. The gas turbine engine component according to claim 1 including at least one internal cooling passage formed within the airfoil and at least one cooling hole formed within the shelf that is in fluid communication with the at least one internal cooling passage.

10. The gas turbine engine component according to claim 9 wherein the at least one cooling hole comprises a plurality of cooling holes formed in the shelf, the cooling holes being located in the shelf at the leading edge, pressure side wall, and suction side wall.

11. The gas turbine engine component according to claim 1 wherein the distal end surface of the tip includes a squealer pocket.

12. The gas turbine engine component according to claim 1, wherein a depth of the shelf is defined between the distal end surface and the bottom surface, and wherein the depth of the shelf becomes shallower and decreases toward the trailing edge.

13. The gas turbine engine component according to claim 12, wherein the depth is constant around the leading edge and remains constant as the shelf extends from the leading edge toward the trailing edge, and wherein the depth of the shelf decreases to a shallower depth near the trailing edge.

14. The gas turbine engine component according to claim 12, wherein the distance between the shelf wall surface and the outer surface of the pressure side wall widens from the leading along the pressure side wall and then narrows toward the trailing edge such that the distance is widest along a center portion of the airfoil.

15. The gas turbine engine component according to claim 1, wherein the leading edge includes a radially extending trench or groove that extends from the bottom surface radially inwardly toward an engine center axis.

16. A gas turbine engine comprising:
a compressor section;
a combustor section downstream of the compressor section; and
a turbine section downstream of the combustor section, and wherein the turbine section includes at least one airfoil having a leading edge, a trailing edge, and pressure and suction side walls extending from upstream ends at the leading edge to downstream ends at the trailing edge, and wherein the airfoil extends from a base to a tip that defines a distal end surface of the airfoil, and wherein the airfoil is defined by a length extending in a direction from the leading edge to the trailing edge;
a shelf formed in the tip, the shelf extending from the pressure side wall, around the leading edge, to the suction side wall, and wherein the shelf defines a bottom surface that is spaced radially inwardly of the distal end surface, and including a shelf wall surface extending from the distal end surface to the bottom surface, and wherein a distance between the shelf wall surface and an outer surface of the pressure side wall varies along the length of the airfoil; and
wherein the shelf wall surface extends along the pressure side wall, around the leading edge, and terminates at an outer surface adjacent the upstream end of the suction side wall such that the shelf extends a greater distance along the pressure side wall than along the suction side wall.

17. The gas turbine engine according to claim 16 including a plurality of cooling holes or slots formed within the bottom surface and/or shelf wall surface, and wherein the holes or slots are located in the shelf at the pressure side wall, leading edge, and suction side wall.

18. The gas turbine engine according to claim 16 wherein the shelf wall surface is defined by a first radius on the pressure side wall and is defined by a second radius on the suction side wall that is different than the first radius.

19. The gas turbine engine according to claim 18 wherein the first radius is greater than the second radius, and wherein the shelf wall surface is defined by a third radius at the leading edge that is less than the second radius.

20. The gas turbine engine according to claim 16 wherein the distal end surface extends across the tip from the shelf wall surface on a pressure side of the airfoil to the shelf wall surface at an upstream end of a suction side of the airfoil, and wherein the bottom surface of the shelf extends uninterrupted around the leading edge from the pressure side wall to terminate at the upstream end adjacent the outer surface of the suction side wall.

21. The gas turbine engine according to claim 16, wherein a depth of the shelf is defined between the distal end surface and the bottom surface, and wherein the depth of the shelf becomes shallower and decreases toward the trailing edge.

22. The gas turbine engine according to claim 21, wherein the distal end surface extends across the tip from the shelf wall surface on a pressure side of the airfoil to the shelf wall surface at an upstream end of a suction side of the airfoil, and wherein the depth is constant around the leading edge and remains constant as the shelf extends from the leading edge toward the trailing edge, and wherein the depth of the shelf decreases to a shallower depth near the trailing edge.

23. The gas turbine engine according to claim 21, wherein the distance between the shelf wall surface and the outer surface of the pressure side wall widens from the leading along the pressure side wall and then narrows toward the trailing edge such that the distance is widest along a center portion of the airfoil.

24. The gas turbine engine according to claim 16, wherein the leading edge includes a radially extending trench or groove that extends from the bottom surface radially inwardly toward an engine center axis.

* * * * *